(12) United States Patent
Chi

(10) Patent No.: US 6,540,864 B1
(45) Date of Patent: Apr. 1, 2003

(54) METHOD OF MAKING A SHOE HAVING A FOAMED INSOLE WITH PERIPHERAL PATTERN

(76) Inventor: Cheng-Hsian Chi, No. 15, Lane 22, Tung-Hsing-Tung St., Nan-Tun Dist., Taichung City (TW)

( * ) Notice: Subject to any disclaimer, the term of this patent is extended or adjusted under 35 U.S.C. 154(b) by 71 days.

(21) Appl. No.: 09/695,824

(22) Filed: Oct. 25, 2000

Related U.S. Application Data

(63) Continuation-in-part of application No. 09/296,384, filed on Apr. 23, 1999, now abandoned.

(30) Foreign Application Priority Data

Jan. 13, 1999 (TW) .......................... 88100544 A

(51) Int. Cl.[7] .............................................. B29C 59/02
(52) U.S. Cl. ...................... 156/245; 156/209; 264/244; 264/319; 264/325; 36/30 R; 36/44
(58) Field of Search ................................ 156/209, 242, 156/245; 264/220, 241, 244, 319, 320, 325; 36/12, 25 R, 30 R, 43, 45, 44

(56) References Cited

U.S. PATENT DOCUMENTS 2,878,523 A * 3/1959 Hardy .......................... 342/408
3,255,491 A * 6/1966 Hardy .......................... 12/33.2
5,147,589 A * 9/1992 Chang et al. ................ 156/245
RE35,905 E * 9/1998 Vincent et al. ............. 12/142 P
6,192,605 B1 * 2/2001 Challant ..................... 12/142 D
6,321,464 B1 * 11/2001 Oberg et al. ............... 12/142 S

* cited by examiner

Primary Examiner—Michael W. Ball
Assistant Examiner—Jessica Rossi

(57) ABSTRACT

In a method for making a shoe, an insole blank having a peripheral portion is prepared. An outsole which has an adhesive applied to the top thereof is positioned in a mold assembly including at least two opposite side mold parts that have forming patterns for forming the peripheral portion of the insole blank. The insole blank is placed in the mold assembly adjacent to the top of the outsole while the insole blank is being softened by heat to a plastic state. The insole blank is pressed against and is bonded to the outsole, and the peripheral portion of the insole blank is pressed and patterned via the side mold parts. The bonding of the insole blank and the outsole and the patterning of the peripheral portion of the insole blank are carried out simultaneously by closing the mold assembly.

11 Claims, 9 Drawing Sheets

METHOD OF MAKING A SHOE HAVING A FOAMED INSOLE WITH PERIPHERAL PATTERN

CROSS REFERENCE TO RELATED APPLICATION

This application is a Continuation-In-Part (C-I-P) of U.S. patent application Ser. No. 09/296,384 which was filed on Apr. 23, 1999, now abandoned.

BACKGROUND OF THE INVENTION

1. Field of the Invention

This invention relates to a method of making a shoe, more particularly, to a method of making a shoe in which a foamed insole blank is formed into a finished and patterned insole during the course of assembly of the insole blank and other shoe components, such as an upper and an outsole.

2. Description of the Related Art

It is known to produce shoes having insoles made of resilient foamed materials, such as EVA foams, which possesses good softness to provide comfortable feeling and which has good resiliency to absorb shock. Such insoles may be fabricated by forming a foamable EVA composition introduced into a mold, or by forming in a mold an insole blank cut from a preformed EVA casting. The insoles as formed are usually bonded to uppers and outsoles by gluing processes. In the manufacture of many sport shoes, foamed insoles are provided with relief-like patterns at the peripheries thereof before they are glued to uppers and outsoles.

For example, U.S. Pat. No. 5,843,352 owned by the applicant of this application discloses a method of producing EVA insoles having ornamental peripheral borders. This method employs the steps of separately forming of an insole and a blank strip, forming the blank strip into a desired shape with an embossed pattern, and attaching the embossed strip to the periphery of the insole by adhesive bonding.

R.O.C. Patent No. 287091 to Jih et al discloses a method forming a foamed EVA insole, wherein an insole blank cut from a cast EVA sheet is foamed in a heated mold and formed into a finished insole which has an upwardly projecting peripheral flange for attachment of an ornamental strip by gluing. The presence of the peripheral flange on the insole facilitates attachment of the ornamental strip.

U.S. Pat. No. 5,560,877 to Yung et al discloses a process for manufacturing an EVA sole, wherein an unfoamed EVA blank sheet is placed in a first mold unit to form a foamed insole blank which in turn is placed in a heated second mold to form an embossed finished insole.

All of the processes disclosed in the aforesaid patents require the first step of forming an insole blank and the second step of embossing or ornamenting the insole blank to form a finished insole structure. These patents merely disclose or teach how an insole is made and patterned before attachment of the insole to other components of a shoe, such as an upper and an outsole.

U.S. Pat. No. 5,463,824 to Barna et al suggests a process for manufacturing an arch support system for a shoe. The teachings therein are directed to the bonding of a foamed layer for a shoe component to other materially different layers of shoe components by applying heat and pressure in a mold. The process disclosed in this patent is related solely to a bonding method and is totally irrelevant to the patterning or embossing of a foamed layer.

Likewise, U.S. Pat. No. 4,231,169 to Toyama et al discloses a bonding method which is independent from the pattern-forming of a shoe component. In the method disclosed therein, a shank comprising a fiber-reinforced resin sheet is placed on an insole element and is adhered thereto under heat and pressure.

While the prior art suggests many processes available for bonding and patterning shoe components, bonding and patterning of shoe components are usually carried out in separate operational steps which are laborious and time-consuming. It is desirable that bonding and patterning of shoe components can be performed simultaneously in order to facilitate and speed up the production of shoes.

SUMMARY OF THE INVENTION

An object of the present invention is to provide an improved and simplified method of making a shoe having a foamed insole formed with ornamented peripheral patterns around the bottom of an upper.

Another object of the present invention is to provide an improved method of making a shoe wherein ornamentation of an insole blank is carried out simultaneously with the bonding of the insole blank to an upper and/or an outsole.

According to the present invention, a method of making a shoe comprises: preparing an insole blank having top and bottom surfaces and a peripheral portion extending around the top and bottom surfaces; applying an adhesive to the top of an outsole; positioning the adhesive-applied outsole in a mold assembly which includes at least two opposite side mold parts having forming patterns for forming the peripheral portion of the insole blank; placing the insole blank in the mold assembly with the bottom surface being disposed adjacent the top of the outsole while the insole blank is being softened by heat to a plastic state; and pressing the insole blank in the plastic state against the outsole to bond the insole blank and the outsole, and pressing and patterning the peripheral portion of the insole blank via the side mold parts, wherein the bonding of the insole blank and the outsole, and the patterning of the peripheral portion of the insole blank are carried out simultaneously by closing the mold assembly.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENTS

Figure 1:
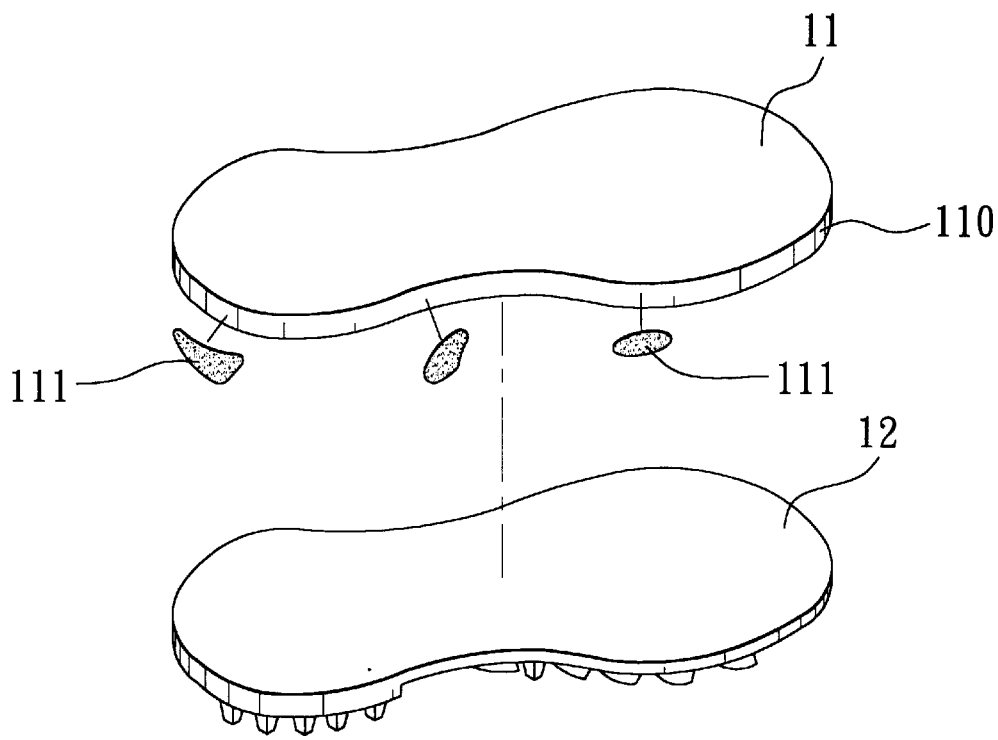
FIG. 1 is a perspective view showing an insole blank and an outsole which are to be assembled in a first embodiment of the method according to the present invention.
Figure 3:
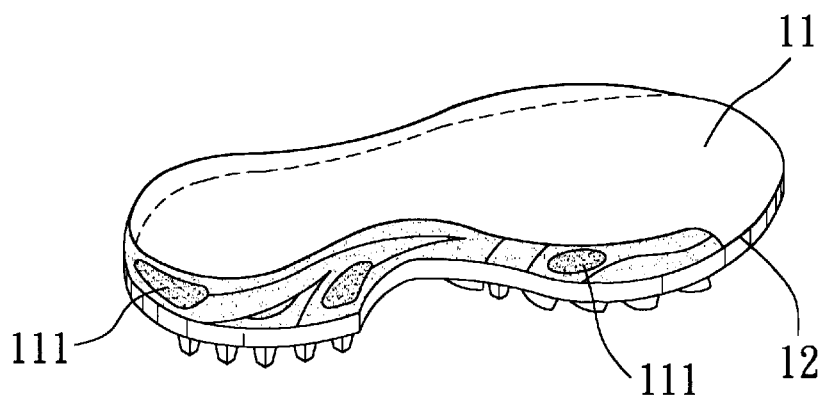
FIG. 3 is a perspective view showing the insole blank and the outsole assembled according to the first embodiment of the present invention.
Figure 2:
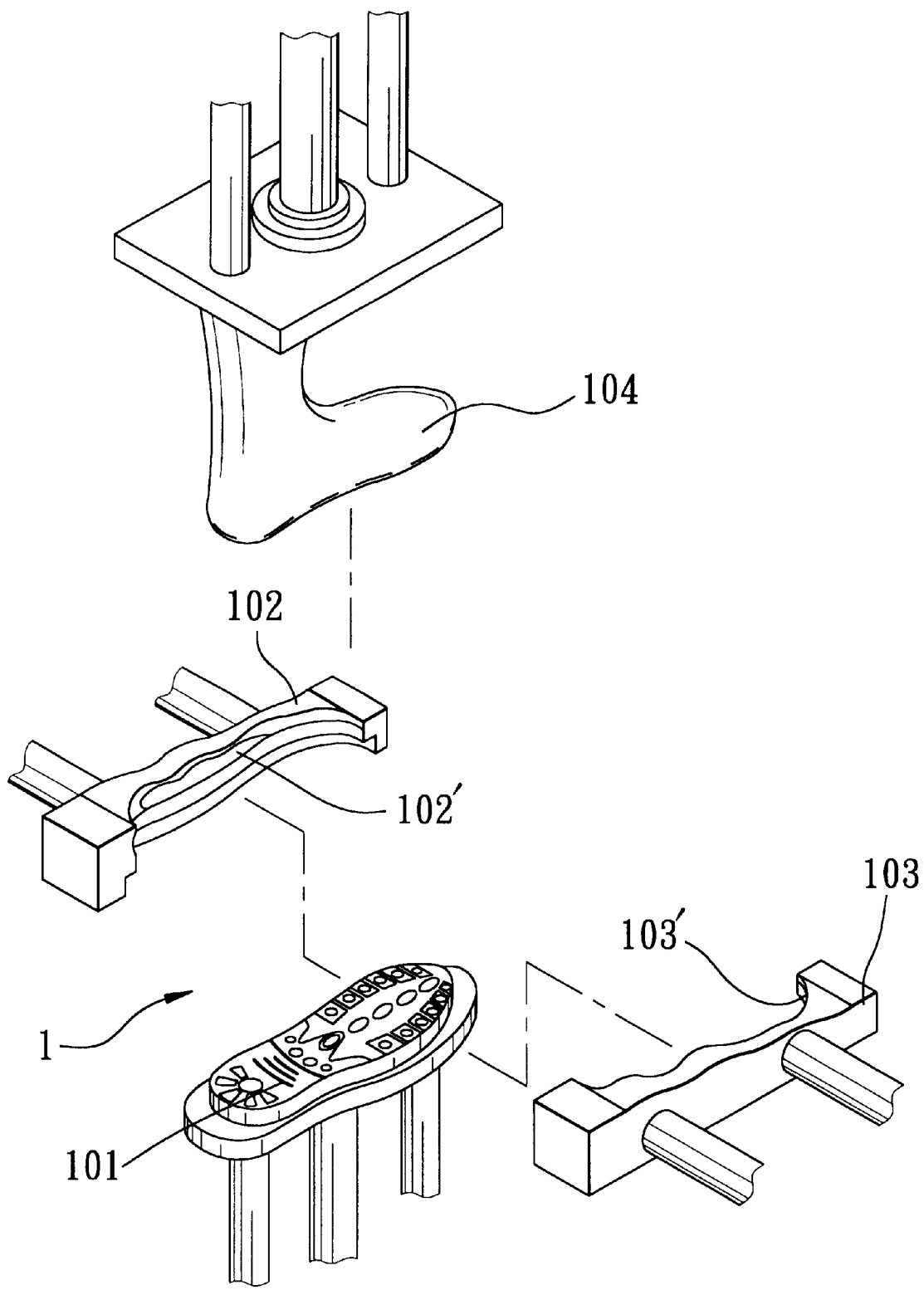
FIG. 2 is a perspective view showing a mold assembly used in the first embodiment of the present invention.

Referring to FIGS. 1, 2 and 3, a first preferred embodiment of the method of making a shoe according to the present invention is directed to the assembly of a foamed insole blank 11 and an outsole 12. The foamed insole blank 11 is prepared from an EVA polymer in a conventional manner, such as by forming a foamable EVA composition into the shape of an insole in a suitable mold, or by tailoring a preformed EVA foam. The foamed insole blank 11 is substantially flat and has top and bottom surfaces surrounded by a peripheral portion 110. The dimensions of the top and bottom surfaces of the foamed insole blank 11 are slightly greater than the dimensions of the top surface of the outsole 12. A mold assembly 1 used in this embodiment includes a bottom mold part 101 for positioning the outsole 12, two opposite side mold parts 102 and 103, and a top mold part 104 having a last. The side mold parts 102, 103 are provided with forming patterns 102', 103' for forming the peripheral portion of the insole blank 11.

In operation, an adhesive, such as a heat-fusible adhesive, is applied to the top surface of the outsole 12, and the outsole 12 coated with the adhesive is positioned on the bottom mold part 101. The insole blank 11 is softened by heat to a plastic state and is placed in the mold assembly 1, while in the plastic state, with the bottom surface of the insole blank 11 in contact with the top surface of the outsole 12. The peripheral portion of the insole blank 11 projects outwardly of the periphery of the outsole 12. Ornamental pieces 111 having different colors are placed in the side mold parts 102, 103. The ornamental pieces 111 may be made of the same material as the insole blank 11 or a different material. In this embodiment, the ornamental pieces 111 are of the same material as the insole blank 11 and are preferably heated to a plastic state prior to placement in the side mold parts 102, 103. When the mold assembly 1 is closed at the plastic state of the insole blank 11, the insole blank 11 is pressed against and bonded to the outsole 12. At the same time, the peripheral portion of the insole blank 11 is pressed to project upward and patterned by the side mold parts 102', 103', and the ornamental pieces 111 positioned on the side mold parts 102, 103 are bonded to the peripheral portion of the insole blank 11, as shown in FIG. 3. Due to the forming patterns 102', 103' of the side mold parts 102, 103, a relief-like pattern is produced on the peripheral portion of the insole blank 11.

Alternatively, the two side mold parts 102, 103 of the mold 1 may be replaced with a single one-piece mold part which has a mold cavity opening at both of the top and bottom sides thereof. In this case, the bottom mold part 101 is fitted in the bottom side of the single one-piece mold part.

Figure 4:
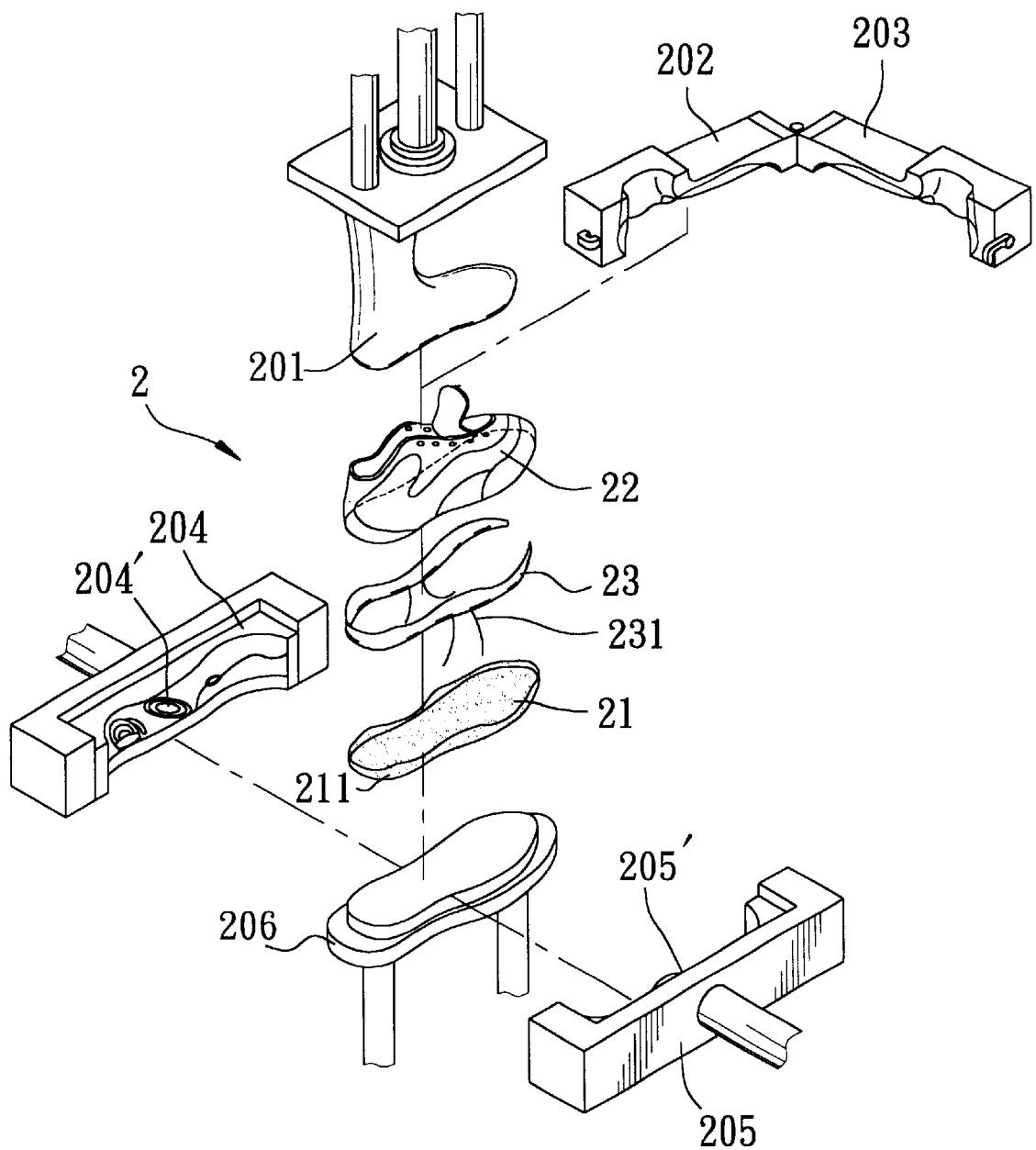
FIG. 4 is a perspective view illustrating assembly of an upper and an insole blank in a mold assembly according to the method of a second embodiment of the present invention.
Figure 5:
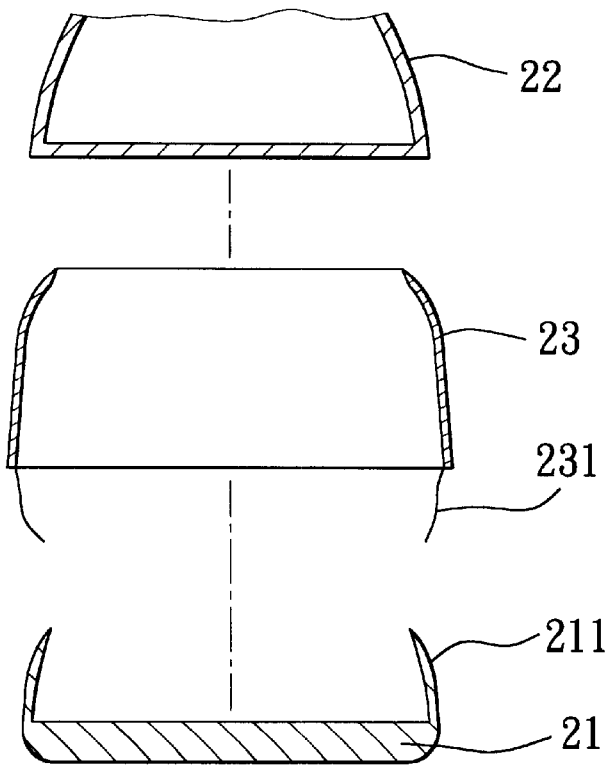
FIG. 5 is a cross-sectional view of an ornamental strip to be attached to the upper and the insole blank in the second embodiment.
Figure 6:
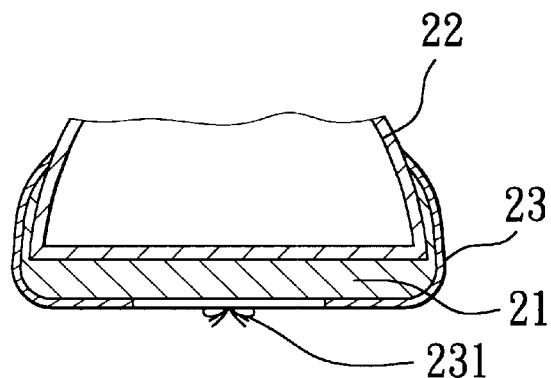
FIG. 6 is a cross-sectional view showing the ornamental strip, the upper and the insole blank assembled according the second embodiment.

Referring to FIG. 4, in a second embodiment of the method of making a shoe according to the present invention, a foamed insole blank 21 and an upper 22 are assembled by using a mold assembly 2. The foamed insole blank 21 differs from the insole blank 11 in that the peripheral portion of the insole blank 21 has a peripheral upward flange 211. The mold assembly 2 includes a top mold part 201, a pair of clamp parts 202, 203, two opposite side mold parts 204, 205, and a bottom mold part 206. The inner surfaces of the side mold parts 204, 205 are provided with forming patterns for patterning the peripheral upward flange 211 of the insole blank 21. The upper 22 is positioned to the top mold part 201 after an adhesive is applied to the bottom of the upper 22. The insole blank 21 is heated to a plastic state and is placed in the mold assembly 2 with the top surface thereof in contact with the bottom of the upper 22. The peripheral upward flange 211 of the insole blank 21 extends around the bottom of the upper 22. Referring to FIGS. 5 and 6 in combination with FIG. 4, an ornamental strip 23 is positioned around the peripheral upward flange 211 of the insole blank 21 by means of fastening elements or strings 231 which tie the ornamental strip 23 and the insole blank 21 together. The ornamental strip 23 is of the same material as the insole blank 21 and is heated to a plastic state prior to placement in the mold assembly 2.

When the mold assembly 2 is closed, the insole blank 21 and the ornamental strip 23, which are in the plastic state, are pressed and embossed and are bonded to the bottom of the upper 22. The peripheral upward flange 211 of the insole blank 21 is therefore patterned and ornamented by the ornamental strip 23.

Figure 7:
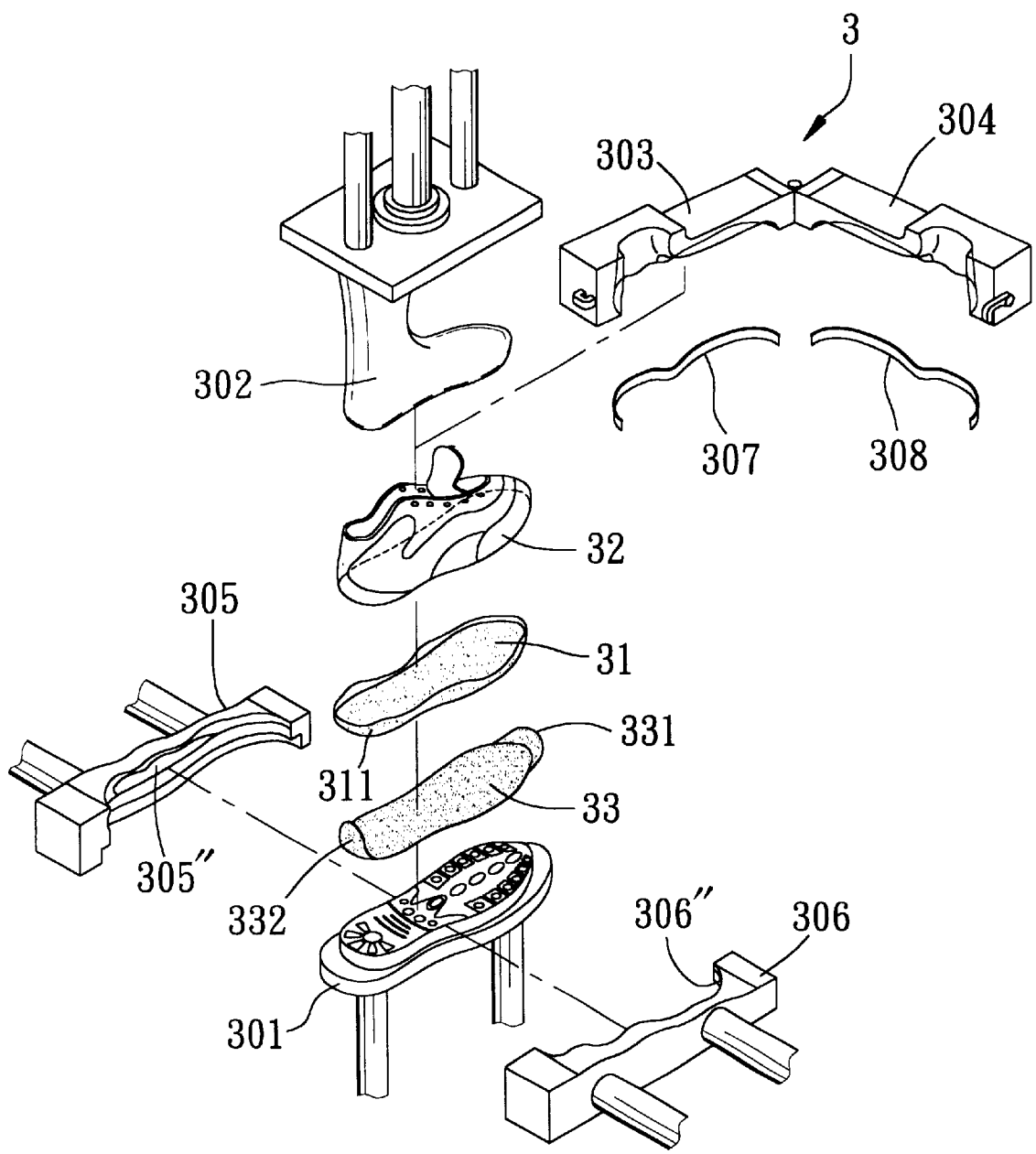
FIG. 7 is a perspective view illustrating assembly of an upper, an insole blank and an outsole in a mold assembly according to a third embodiment of the present invention.

Referring to FIG. 7, a third embodiment of the method of making a shoe according to the present invention is purposed to assemble an upper 32, an insole blank 31, and an outsole 33. In this embodiment, the insole blank 31 in the plastic state is placed in a mold assembly 3 together with the upper 32 and the outsole 33 coated with an adhesive. The mold assembly 3 includes a bottom mold part 301, a top mold part 302, left and right clamping parts 303, 304, and a pair of side mold parts 305, 306 with inner surfaces provided with forming patterns 305", 306". When the mold 3 is closed, the upper 32, the insole blank 31 and the outsole 33 are assembled integrally together. At the same time, the insole blank 31 is formed into a final desired shape with the peripheral upward flange 311 thereof being embossed and patterned.

Figure 8:
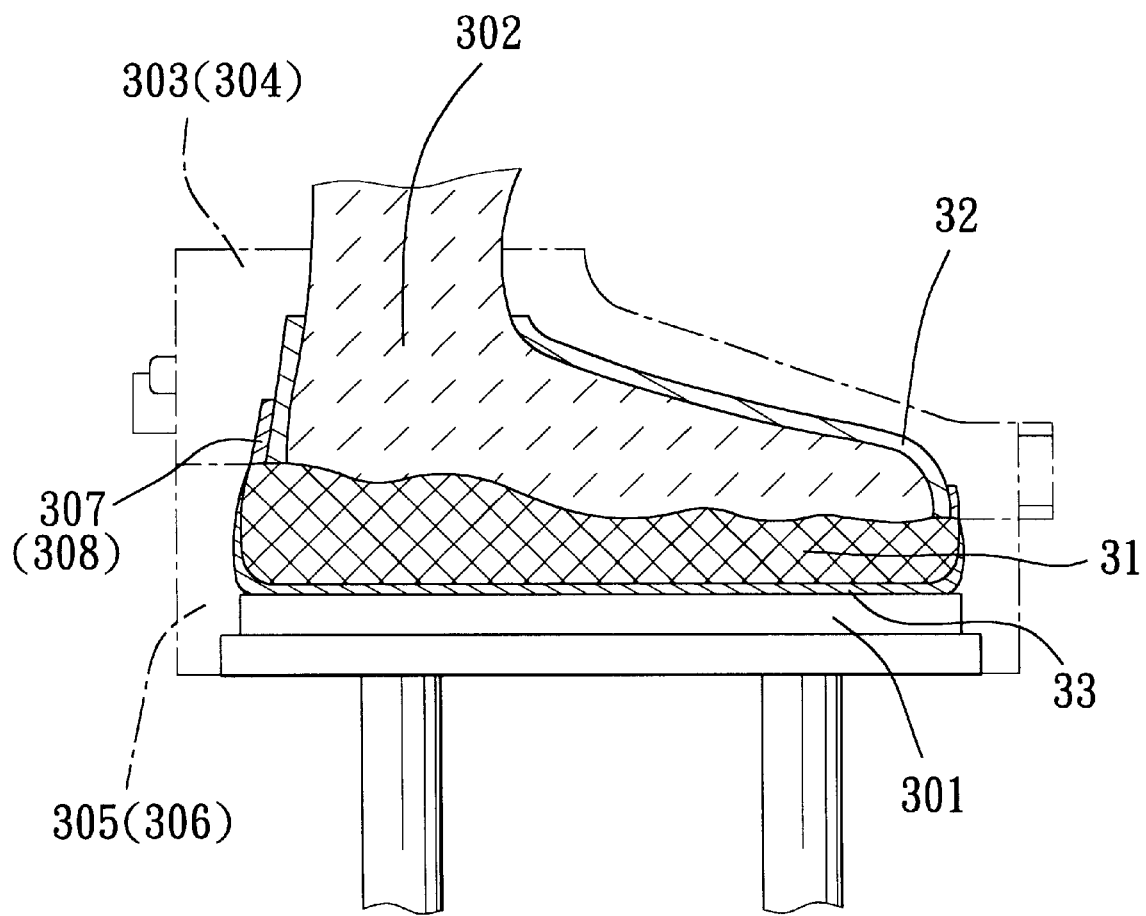
FIG. 8 is a cross-sectional view of the mold assembly of the third embodiment in a closed position.

Note that the mold assembly 3 is provided with fence plates 307, 308 adjacent the top end of the side mold parts 305, 306. The fence plates 307, 308 are configured as elongated strips which are curved to conform to the contour of the upper 32. When the mold 3 is closed, the bottom ends of the fence plates 307, 308 abut against the top of the peripheral upward flange 311 of the insole blank 31, as shown in FIG. 8, so that the flash produced from the insole blank 31 is blocked from flowing upward and is diverted to flow outwardly of the fence plates 307, 308. As such, no brow formation will occur around the insole blank 31 after assembly. The flash formed outwardly of the fence plates 307, 308 can be removed easily.

Referring again to FIG. 7, during the forming operation in the mold assembly 3, front and rear stop plates 331, 332, which are disposed at the front and rear ends of the outsole 33 at locations corresponding to the front and rear seams of the two side mold parts 305, 306, are bonded to the front and rear ends of the upper 32 and the insole 31. The seams formed on the stop plates 331, 332 due to the front and rear seams of the side mold parts 305, 306 may be removed, if desired, by pressing and embossing the seams with a heated embossing tool.

Figure 9:
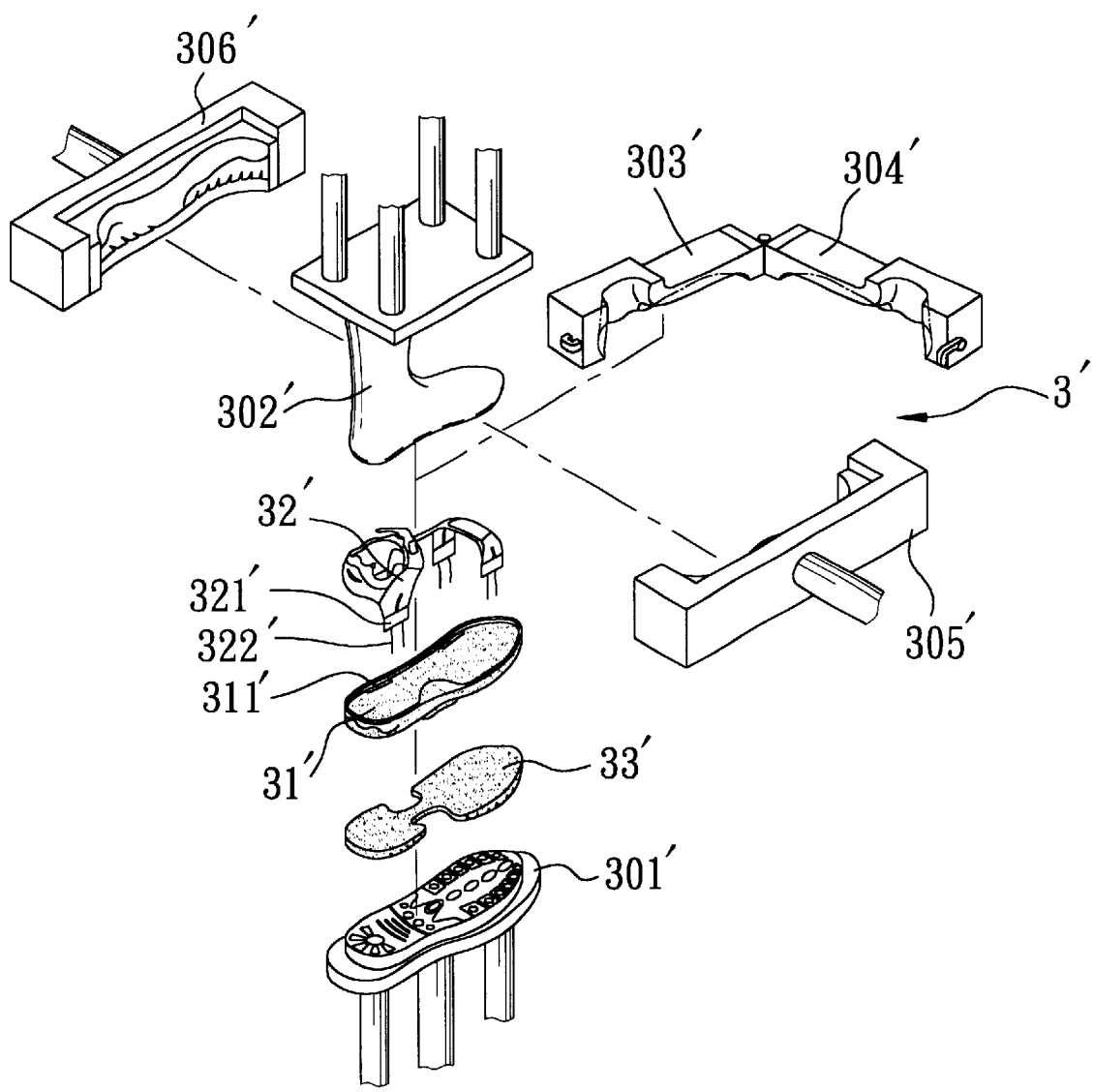
FIG. 9 is a perspective view illustrating the manufacturing of a sandal via a mold assembly according a fourth embodiment of the present invention.
Figure 10:
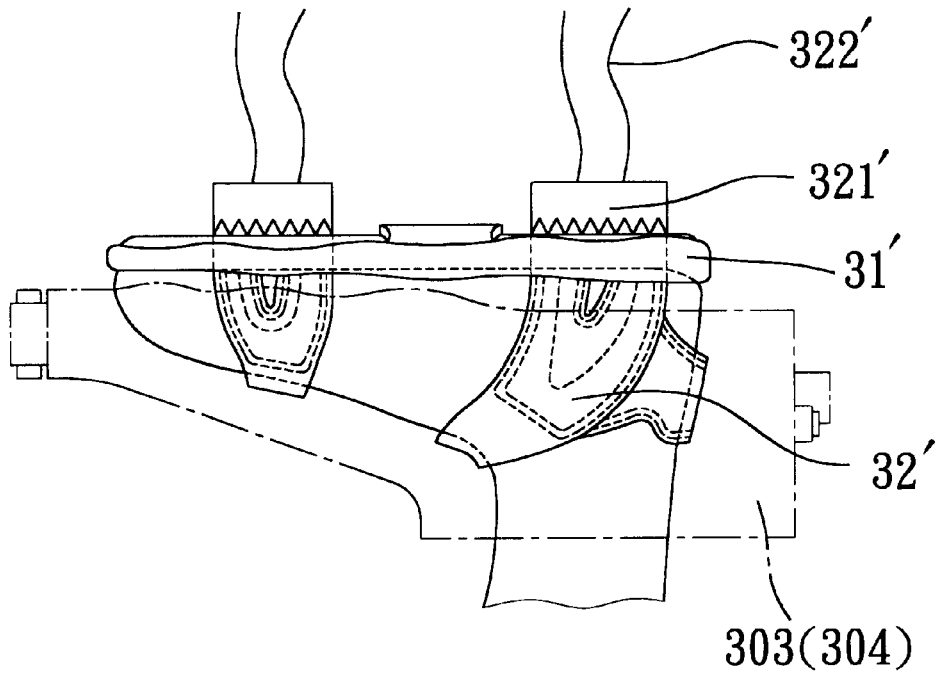
FIG. 10 is a schematic view of the sandal assembled in the fourth embodiment when the mold assembly is closed.

FIGS. 9 and 10 illustrate a fourth embodiment of the method of making a sandal. In this embodiment, an insole blank 31' is provided with through-holes 311' at the margin thereof. The upper 32' includes a plurality of sandal straps 321' attached with fastening elements 322'. After the straps 321' pass through the through-holes 311' in the insole blank 31' which has been heated, the fastening elements 322' are connected to each other, thus bringing together the upper 32' and the insole 31'. The upper 32' and the insole 31' are then placed within a top mold part or last 302' and left and right clamping parts 303', 304', as shown in FIG. 10. When the mold assembly 3' is closed by bringing together the top mold part 302, the left and right clamping parts 303', 304', side mold parts, 305', 306', and a bottom mold part 310', the upper 32' and the insole 31' are united integrally together with an outsole 33'.

Figure 11:
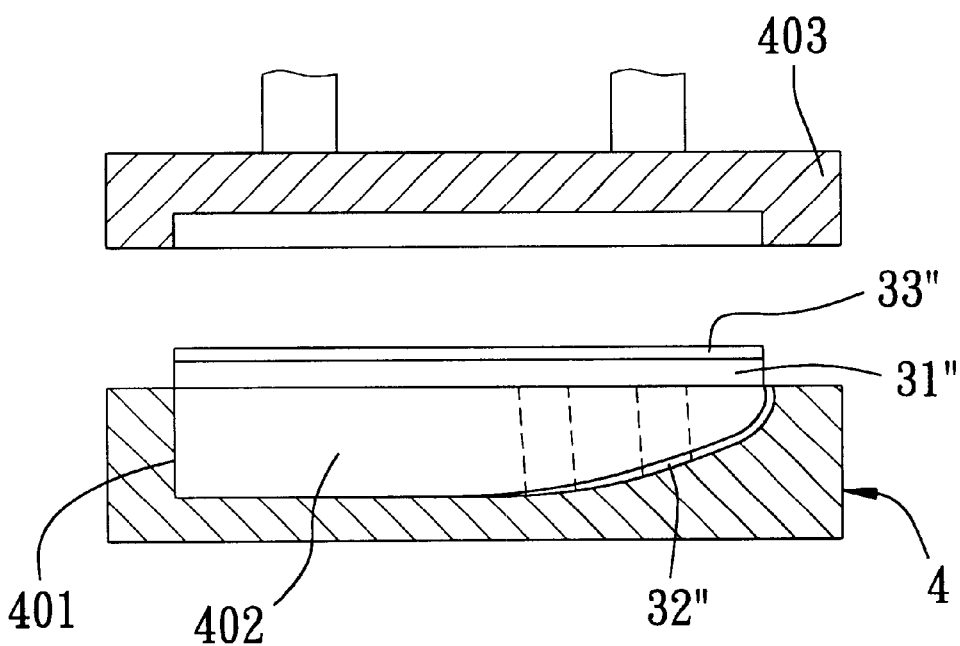
FIG. 11 is a schematic cross-sectional view showing an alternative mold assembly for manufacturing a sandal.

Referring to FIG. 11, in place of the aforesaid mold assembly 3', another mold which has mother and daughter mold members may be used for making a sandal. A mold part 4 is provided with a cavity 401 opening at one side of the mold part 4. After a daughter mold member 402 is inserted into an upper 32", the daughter mold member 402 together with the upper 32" is placed in the cavity 401. An insole 31" and an outsole 33" are then placed on the upper 32". The mold part 4 is closed by a mold cover 403 to assemble the insole 31", the outsole 33" and the upper 32".

Figure 12:
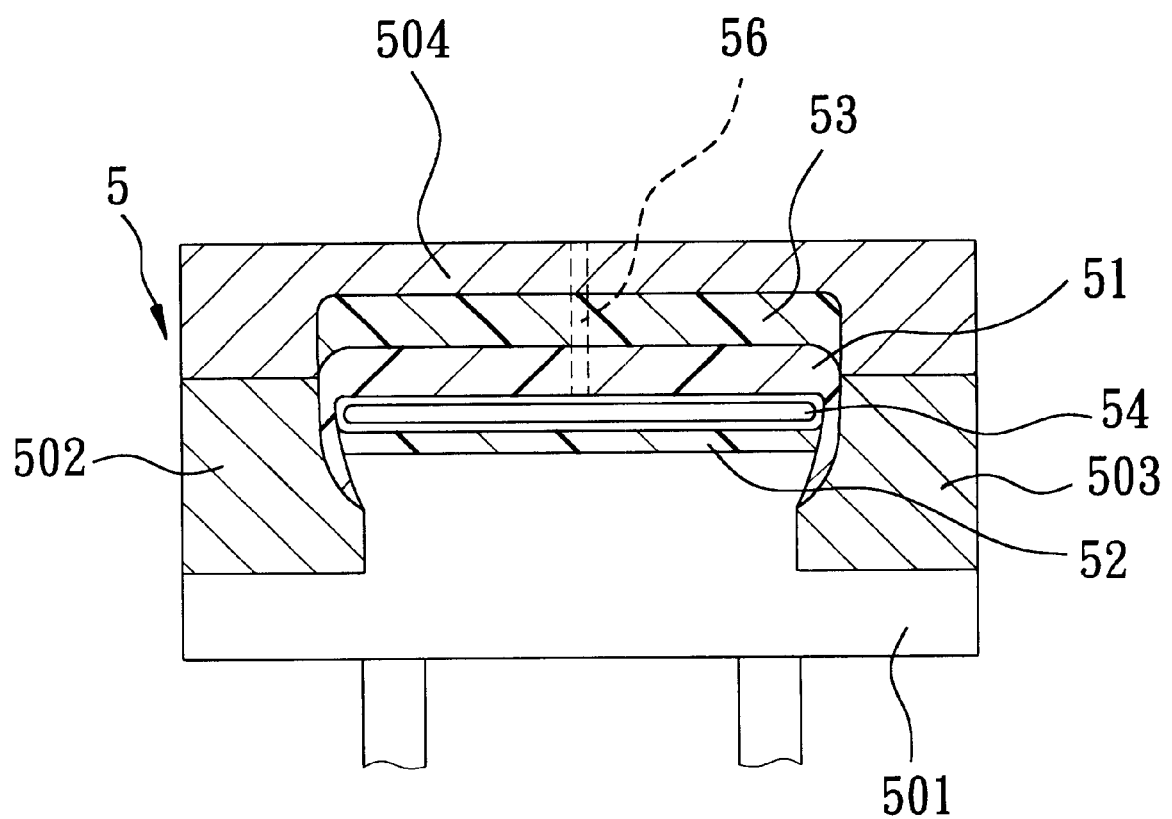
FIG. 12 is a schematic cross-sectional view illustrating assembly of an outsole and an insole blank enclosing an air cushion pocket in accordance with a fifth embodiment of the present invention.

Referring to FIG. 12, in a fifth embodiment of the present invention, an air cushion pocket 54 is attached to an insole blank 51 during assembly of the insole blank 51 and an outsole 53 in a mold assembly 5. The outsole 53 is first positioned in a top mold 504, and the insole blank 51, which is heated to a plastic state, is placed onto the outsole 53. The air cushion pocket 54 is further placed on the insole blank 51 and covered by a cover plate 52 which is made of the same material as the insole blank 51. When the mold assembly 5 is closed by moving side mold parts 502, 503 and a bottom mold part 501 toward the top mold part 504, the cover plate 52 is bonded to the insole blank 51, enclosing the air cushion pocket 54 therebetween, and the insole 51 and the outsole 53 are united together. As the air cushion pocket 54 is inflated by injecting air through an air passage 56 after the mold assembly 5 is closed, the insole blank 51 and the cover plate 52 are pressurized to abut against the inner surface of the side mold parts 502, 503. As a result, a clear embossed pattern is formed on the peripheral portion of the insole blank 51. The product as formed possesses good shock absorbing characteristics due to the presence of the air cushion pocket 54.

Shoes having shock absorbing properties may be fabricated by incorporating a PU foam into an insole in place of the air cushion pocket 54. In manufacturing, a liquid PU foam material is introduced into a mold between an outsole and an insole. Prior to introduction of the PU foam material into the mold, air is blown into the mold between the outsole and the insole to create a space therebetween. At the same time, the peripheral portion of the insole blank in the plastic state is pressurized to abut against the inner surface of the mold. The PU foam material is introduced into the space as soon as the blowing of the air is stopped. A clear embossed pattern can be formed on the peripheral portion of the insole blank.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

I claim:

1. A making a shoe comprising: preparing an insole blank having top and bottom surfaces and an upwardly extending peripheral flange extending upward from said top surface:
    applying an adhesive to the top of an outsole;
    applying an adhesive to the bottom of an upper: positioning the adhesive-applied outsole in a mold assembly which includes a top mold part, a bottom mold part, and two opposite side mold parts having forming patterns, wherein said outsole is mounted on said bottom mold part; mounting said upper, which has said adhesive applied thereto, on said top mold part:
    placing said insole blank in said mold assembly between said outsole and said upper and positioning said upwardly extending peripheral flange of said insole blank around a lateral outer surface of said upper, wherein said insole blank is softened by heat to a plastic state prior to placement in the mold assembly;
    closing said mold assembly to press said outsole, said insole blank and said upper against each other while said insole blank is in the plastic state; and
    pressing said upwardly extending peripheral flange of said insole blank in said plastic state against said lateral outer surface of said upper and patterning said upwardly extending peripheral flange of said insole blank via said side mold parts, wherein said insole blank in said plastic state is patterned by said forming pattern of said side mold parts, and wherein the bonding of said insole blank to said upper and to said outsole and the patterning of said upwardly extending peripheral flange of said insole blank are carried out simultaneously by closing said mold assembly.

2. The method as claimed in claim 1, further comprising the steps of placing an air cushion pocket on said insole blank, and placing a cover plate, which is made of the same material as said insole blank, on said air cushion pocket before said mold assembly is closed, the step of pressing said cover plate against said insole blank to bond said cover plate and said insole blank by closing said mold assembly, thus enclosing said air cushion pocket, and the step of inflating said air cushion pocket so as to pressurize said insole blank and said cover plate against said mold assembly when said mold assembly is closed.

3. The method as claimed in claim 1, wherein said mold assembly further comprises said top mold part including a last and fence plates, said fence plates being disposed at the bottom of said top mold part and extending to the top ends of said opposite side mold parts so as to block the top end of said peripheral portion of said insole blank, whereby flash resulting from said insole blank can be diverted to flow outwardly of said fence plates.

4. The method as claimed in claim 1, wherein said upwardly extending peripheral flange of said insole blank is embossed to form a relief-like pattern.

5. The method as claimed in claim 4, wherein said top and bottom surfaces of said insole blank have dimensions greater than those of said outsole so that said peripheral portion of said insole blank extends outward beyond a periphery of said outsole when said insole blank is placed on said outsole, said peripheral portion of said insole blank being pressed by said mold parts to project upward and to create said relief-like pattern on said peripheral portion.

6. The method as claimed in claim 1, wherein said upper includes a plurality of sandal straps.

7. The method as claimed in claim 6, wherein said mold assembly further includes said top mold part having a daughter mold part for positioning said sandal straps.

8. The method as claimed in claim 1, further comprising preparing an ornamental element, placing said ornamental element in said mold assembly around said upwardly extending peripheral flange of said insole blank before said mold assembly is closed, and pressing said ornamental element against said upwardly extending peripheral flange of said insole blank to bond said ornamental element to said peripheral flange and to create a relief like pattern.

9. The method as claimed in claim 8, wherein said ornamental element is made of the same material as said insole blank.

10. The method as claimed in claim 7, wherein said ornamental element is configured as a strip blank and wherein the method further comprises fastening said strip blank around said peripheral flange of said insole blank before said mold assembly is closed.

11. The method as claimed in claim 10, wherein said strip blank is made of the same material as said insole blank and is softened by heat prior to placement into said mold assembly.

* * * * *